No. 742,800. PATENTED OCT. 27, 1903.
J. N. PATTEN.
VELOCIPEDE HARNESS.
APPLICATION FILED JUNE 24, 1901.
NO MODEL.
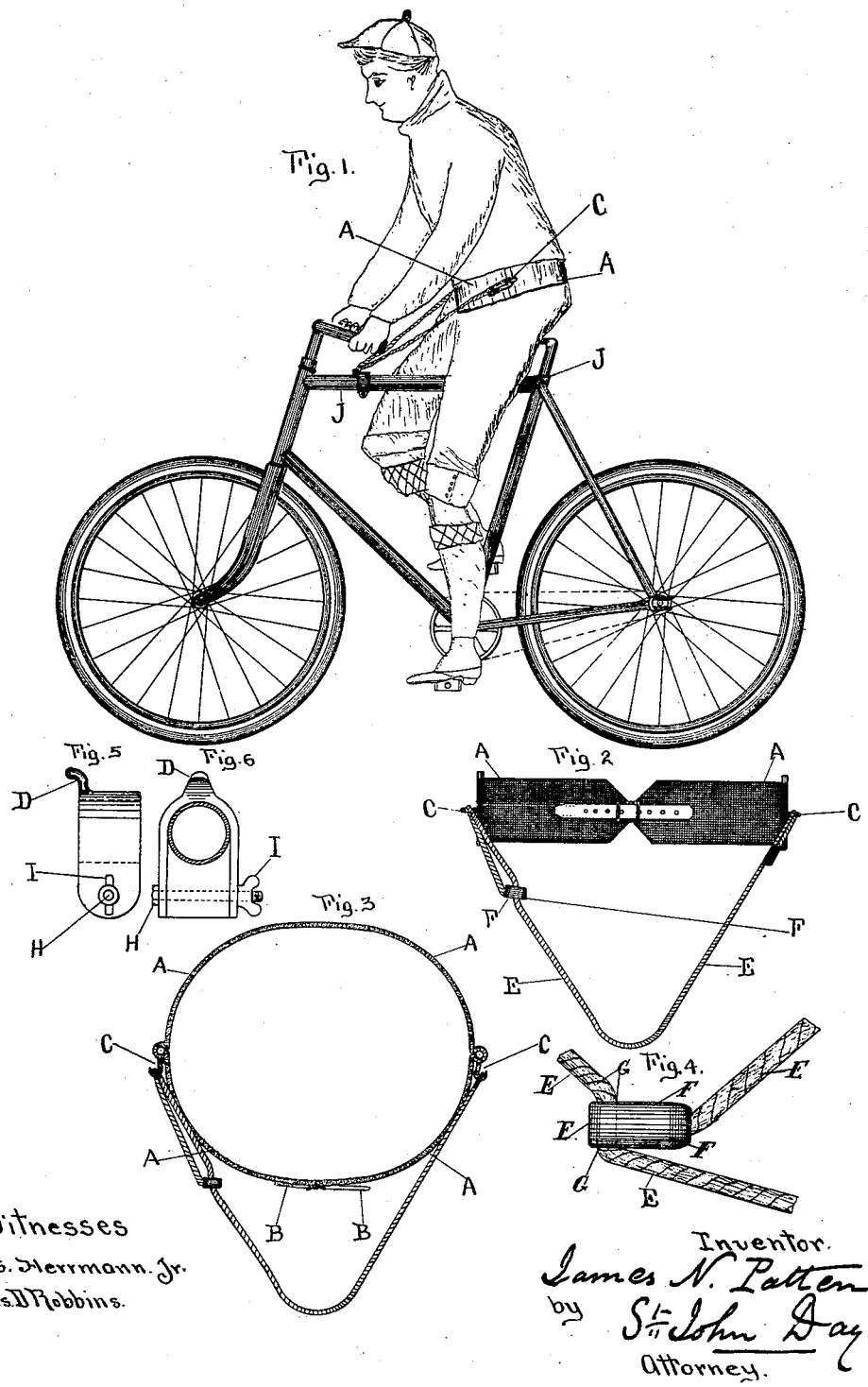
Witnesses
Chas. Herrmann, Jr.
Chas. D. Robbins.
Inventor.
James N. Patten.
by St. John Day.
Attorney.

No. 742,800.

Patented October 27, 1903.

UNITED STATES PATENT OFFICE.

JAMES N. PATTEN, OF COLEGROVE, CALIFORNIA.

VELOCIPEDE-HARNESS.

SPECIFICATION forming part of Letters Patent No. 742,800, dated October 27, 1903.

Application filed June 24, 1901. Serial No. 65,885. (No model.)

*To all whom it may concern:*

Be it known that I, JAMES N. PATTEN, of Colegrove, in the county of Los Angeles, State of California, have invented a new or Improved Velocipede-Harness, of which the following is a full, clear, and exact description or specification, reference being had to the annexed sheet of drawings and to the letters marked thereon.

Upon the annexed drawings, Figure 1 is a side elevation of a bicycle and a bicycle-rider thereon, showing my new or improved device connecting or attaching the rider and the bicycle together in the manner hereinbefore described. Fig. 2 is a detached front elevation of my device upon a larger scale than shown at Fig. 1. Fig. 3 is a plan of my device upon the same scale as Fig. 2. Fig. 4 is a side elevation of the cleat for fastening the cord to one of the hooks of the body-strap of the attachment and for retaining the cord in any desired position of stress. Fig. 5 is a side elevation of the hook for connecting my device to the framing of the bicycle. Fig. 6 is an end elevation of the said hook shown at Fig. 5.

Upon the drawings the abdominal belt is marked A A, and the fastening of the abdominal band or belt is marked B B. The hooks at the side of the belt A A are marked C C, and the cord for fastening the belt A A and the hook D D to the framing of the bicycle is marked E E. Upon one end of the cord E E there is fastened the cleat F, as shown more especially at Fig. 4. In this cleat F the transverse hole G is constructed so that the cord E may pass through this cleat F at right angles to the direction of the hole whereinto the end of the cord E is fastened into the cleat F, whereby when the cord E becomes strained on being moved through the transverse hole G in the cleat frictional resistance to the movement of the cord E through the hole G is produced by reason of the strain being in the direction at right angles to the length of the cord E, and therefore straining the cord E hard or tightly against the diametrically opposite angles of opposite ends of the hole G in the cleat F, wherefore it results from this arrangement that by pulling the cleat F into such position that when the rider is on the bicycle the cord E becomes tightly tensed around the hook D, that the tension of the cord is maintained so long as the rider remains upon his bicycle unless the cord E be disconnected from the hook D by being moved out of engagement either by the rider or by some person removing the cord from such engagement other than a rider, and the hook D is so shaped at the engaging point thereof that when a rider dismounts from his bicycle the cord E instantly becomes disengaged from the hook D. The hook D is fastened to the upper bar of the bicycle-framing by means of the pinching-bolt H being tightened by means of the thumb-nut I, so that the position of the hook D upon the upper bar J of the framing may be adjusted from time to time, according to the shape, dimensions, and convenience of the rider himself. The position of maximum advantage for the hook D upon the bar J is such that the hook D is situated just above the knee-joint of the rider when the rider is upon the bicycle.

Having now described the nature of my said invention and the best system, mode, or manner with which I am at present acquainted for carrying the same into practical effect, I desire to observe in conclusion that what I consider to be novel and original, and therefore claim as the invention to be secured to me by Letters Patent, is as follows:

The combination of the abdominal belt, the hooks the continuous cord connecting the hooks, the cleat, and the clamp adapted to be secured to the frame of the bicycle and provided with a hook adapted to engage the cord of the device, all operating in the manner and for the purposes substantially as hereinbefore described.

In testimony whereof I, the said JAMES N. PATTEN, have hereunto set my hand and seal this 24th day of April, 1901.

JAMES N. PATTEN. [L. S.]

Witnesses:
E. C. HARRINGTON,
H. B. FRANCIS.